United States Patent [19]

Kanazawa et al.

[11] Patent Number: 4,610,328

[45] Date of Patent: Sep. 9, 1986

[54] FOUR-WHEEL STEERING SYSTEM FOR VEHICLE

[75] Inventors: Hirotaka Kanazawa; Teruhiko Takatani; Shigeki Furutani, all of Hiroshima; Isamu Chikuma, Gumma; Satoru Shimada, Gumma; Hiroshi Eda, Gumma, all of Japan

[73] Assignees: Mazda Motor Corp., Hiroshima; Nippon Seiko Kabushiki Kaisha, Tokyo, both of Japan

[21] Appl. No.: 696,144

[22] Filed: Jan. 29, 1985

[30] Foreign Application Priority Data

Feb. 1, 1984 [JP] Japan .............................. 59-12869[U]
Feb. 8, 1984 [JP] Japan .............................. 59-17177[U]

[51] Int. Cl.[4] .............................................. B62D 5/10
[52] U.S. Cl. ........................................ 180/140; 280/91
[58] Field of Search ........................... 180/140; 280/91

[56] References Cited

U.S. PATENT DOCUMENTS

4,295,657 10/1982 Sano et al. ........................ 180/140
4,467,885 8/1984 Furukawa et al. .................. 180/79
4,506,899 3/1985 Sano .................................. 280/91

Primary Examiner—John J. Love
Assistant Examiner—Donn McGiehan
Attorney, Agent, or Firm—Gerald J. Ferguson, Jr.; Michael P. Hoffman; James E. Bryan

[57] ABSTRACT

The rear wheels of a vehicle are turned in response to the turning of the front wheels upon operation of the steering wheel. A rack member is provided to be operatively connected with a movable member of the front wheel steering system which is moved right and left in response to operation of the steering wheel so that the rack member is moved together with the movable member. The rack member is in mesh with a pinion fixed to an end of an output shaft whose rotation is transmitted to the rear wheel steering system as steering force for moving it by way of a transmission shaft.

6 Claims, 13 Drawing Figures

FOUR-WHEEL STEERING SYSTEM FOR VEHICLE

BACKGROUND OF THE INVENTION

1. Field of the Invention

This invention relates to a steering system for a vehicle, and more particularly to a four-wheel steering system for a vehicle in which the rear wheels are arranged to be turned in response to the turning of the front wheels when the steering wheel is turned.

2. Description of the Prior Art

Conventionally, in four-wheeled cars, generally only the front wheels are turned in response to operation of the steering wheel. However, there has been proposed a four-wheel steering system in which the rear wheels are turned together with the front wheels in response to operation of the steering wheel in order to improve steering performance and running stability and to facilitate the steering of the vehicle.

For example, when the rear wheels are turned in the same direction as the front wheels during travel at a relatively high speed, the vehicle body can be directed substantially tangential to the turning circle without a delay in phase from the turning operation of the steering wheel because side force acts simultaneously on both the rear and front wheels, whereby lanes can be changed smoothly during high speed travel. Further, by turning the rear wheels in the reverse direction to the front wheels when the vehicle is traveling at very low speed, the orientation of the vehicle body can be changed considerably, and accordingly the vehicle can be easily driven into a small space or a garage.

Taking into account the fact that generally it is not during high speed travel but during relatively low speed travel that the steering wheel or the front wheels are turned by a large amount, the four-wheel steering system may be arranged to turn the rear wheels in the same direction as the front wheels when the turning angle of the front wheels is small and in the reverse direction when the turning angle of the front wheels is large.

Theoretically, such a four-wheel steering system can be realized in various ways. For example, there have been proposed various four-wheel steering systems in which the rear wheels are turned in response to operation of the steering wheel by way of electrical means or hydraulic means. However, the four-wheel steering systems in accordance with the conventional proposals are generally disadvantageous in that the structure is apt to be complicated and costly, and provisions for ensuring reliabilities in safety upon occurrence of failure, maintenance and the like are required. In order to simplify the structure and improve reliability, there have been proposed various four-wheel steering systems in which the movement of the steering system for the front wheels is transmitted to the steering system for the rear wheels by way of mechanical means as a force for controlling the movement of the rear wheels. For example, there is disclosed in U.S. Pat. No. 4,295,657 a four-wheel steering system in which a front wheel steering system and a rear wheel steering system are mechanically connected by way of a link and a cam mechanism so that the rear wheels are turned in response to the turning of the front wheels and the steering ratio of the rear wheels is changed with the steering angle of the front wheels. However, in link mechanisms or cam mechanisms, slight play or clearance must generally be provided at each junction between components in order to ensure smooth movement of the components and accordingly play in the turn of the rear wheels with respect to the turn of the front wheels becomes large, giving rise to fluctuation in the turning direction of the rear wheels, delay in turning of the same and various other drawbacks.

Further, in the four-wheel steering systems disclosed in U.S. Pat. No. 4,467,885, a rack-and-pinion type steering device for the front wheels is provided with an additional pinion in mesh with the rack and rotation of the additional pinion is transmitted to a rear wheel steering system by way of a transmission shaft. This arrangement is advantageous over the aforesaid arrangement using a link and a cam mechanism so long as the play in the turn of the rear wheels with respect to the turn of the front wheels can be reduced but involves a problem with the mounting of the additional pinion. That is, because two pinions must be in mesh with a single rack and the position of the original pinion connected to the steering wheel (the position of which cannot be changed) can be hardly changed, the mounting position of the additional pinion is inherently limited. If the steering system for the front wheels is a power-steering system and a power cylinder must be provided on the rack, the mounting position of the additional pinion is further limited. Therefore, there arises a problem with mounting of the transmission shaft for transmitting rotation of the additional pinion to the rear wheel steering system. That is, it is preferred that the transmission shaft is disposed as high as possible so as not to project downward and reduce the minimum ground clearance. Therefore, it is most preferable that the transmission shaft is disposed in the tunnel portion of the vehicle body. However due to the aforesaid limitation in the mounting position of the additional pinion, it is not always possible to dispose the transmission shaft in the tunnel portion. When it is not possible to dispose the transmission shaft in the tunnel portion, a space for accommodating the transmission shaft must be prepared which results in change of the vehicle body shape.

SUMMARY OF THE INVENTION

In view of the foregoing observations and description, the primary object of the present invention is to provide a four-wheel steering system which is capable of providing an increased freedom in positioning the shaft for transmitting the movement of the front wheel steering system to the rear wheel steering system as the steering force of the latter.

In accordance with the present invention, a rack member is provided to be operatively connected with a movable member of the front wheel steering system which is moved right and left in response to operation of the steering wheel so that the rack member is moved together with the movable member. The rack member is in mesh with a pinion fixed to an end of an output shaft and the output shaft is rotated in response to the movement of the rack member. The rotation of the output shaft is transmitted, by way of a transmission shaft, to the rear wheel steering system as steering force for moving it.

DESCRIPTION OF THE PREFERRED EMBODIMENT

Figure 1:
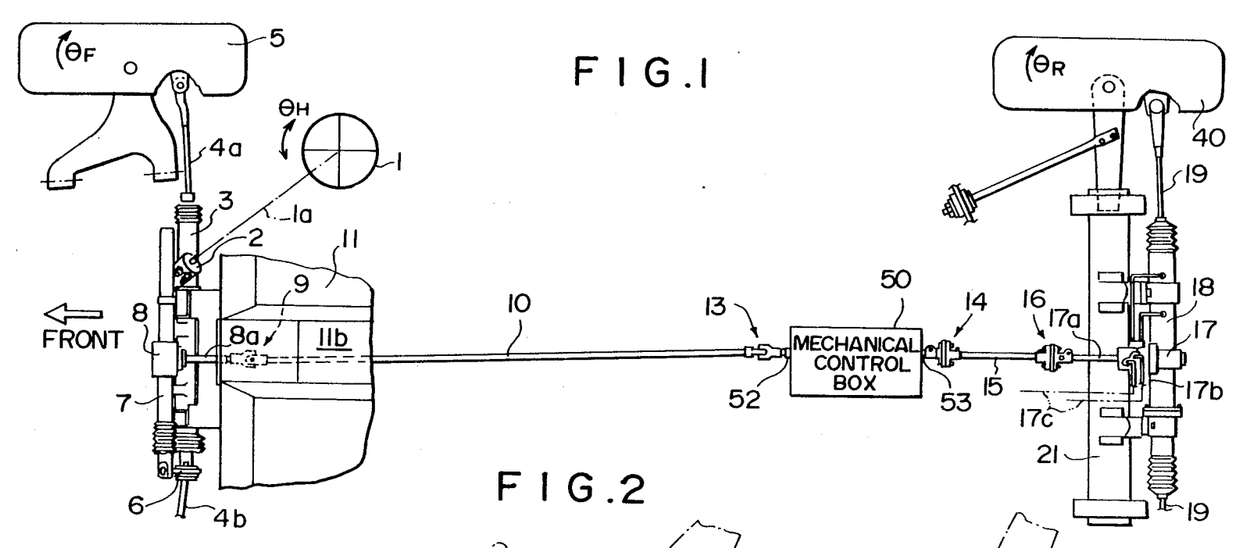
FIG. 1 is a fragmentary plan view schematically showing a four-wheel steering system in accordance with an embodiment of the present invention.
Figure 2:
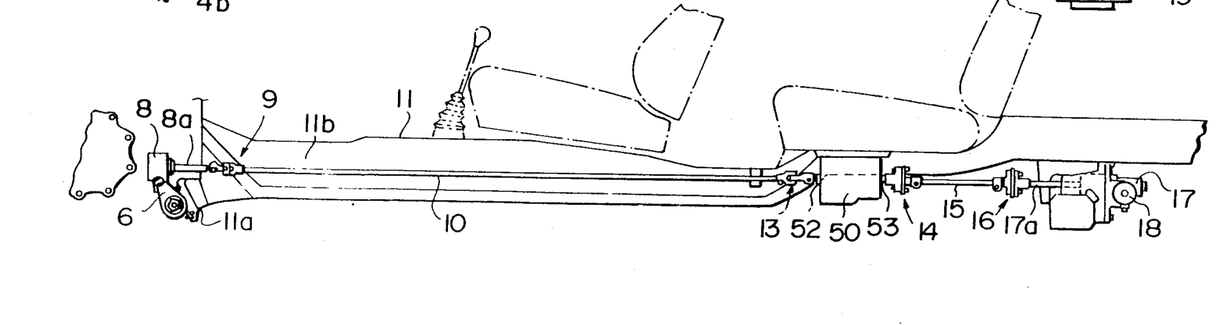
FIG. 2 is a fragmentary side view of the steering system.

In FIGS. 1 and 2, when a steering wheel 1 is operated or rotated, rotation of the steering wheel 1 is transmitted to a first gear box 2 by way of a steering shaft 1a, and is converted to a movement in the transverse direction of the vehicle body by a known mechanism such as a rack-and-pinion mechanism, whereby a first rack in a first rack housing 3 is moved in the transverse direction of the vehicle body. Right and left tie-rods 4a and 4b are connected to the respective ends of the first rack so that knuckle arms connected to the right and left tie-rods 4a and 4b are moved to turn front wheels 5 mounted on knuckles for rotation. In the first rack housing 3 is provided a power cylinder into which is fitted a piston fixed to the first rack. Pressurized oil is fed into the power cylinder from an oil pump (not shown) by way of a front wheel control valve in response to operation of the steering wheel 1 to move the piston to assist in moving the first rack. The steering system for the front wheels in the form of a power steering system is formed thus. The steering system for the front wheels is mounted on the vehicle body 11 by fixing the first rack housing 3 to a bracket 11a on the vehicle body 11.

To the first rack housing 3 is fixed a second rack housing 7 in which a second rack is disposed to be slidable in the transverse direction of the vehicle body in parallel to the first rack. The first and second racks are connected with each other by a connecting arm 6 to move together with each other in response to operation of the steering wheel 1. When the second rack is moved, a second pinion is rotated which is in mesh with the second rack in a second gear box 8 fixed to the second rack housing 7. To the second pinion is connected an output shaft 8a which projects rearward from the second gear box 8. The output shaft 8a is connected to an input shaft 52 of a mechanical control box 50 by way of a first universal joint 9, a forward transmission shaft 10 and a second universal joint 13 disposed in the tunnel portion 11b of the vehicle body 11 so that rotation of the second pinion is transmitted to the input shaft 52. Rotation of the input shaft 52 of the mechanical control box 50 is converted in the control box 50 into rotation of an output shaft 53 thereof to be described in detail later. Rotation of the output shaft 53 is transmitted to an input shaft 17a by way of a first coupling 14, a rearward transmission shaft 15 and a second coupling 16. The input shaft 17a is connected to a third pinion disposed in a third gear box 17.

The third gear box 17 is fixedly mounted on a third rack housing 18 which is fixed to a sub frame 21. In the third rack housing 18 is disposed a third rack which is movable in the transverse direction of the vehicle body and is in mesh with the third pinion, and the opposite ends of which are respectively connected to right and left rear tie-rods 19. Rotation of the third pinion causes transverse movement of the third rack which is transmitted to knuckle arms, whereby rear wheels 40 rotatably supported on the knuckle arms are turned. A power cylinder is provided in the third rack housing 18 and a piston fixed to the third rack is fitted into the power cylinder. Pressurized oil is fed, from an oil pressure line 17c, into the power cylinder in response to rotation of the input shaft 17a by way of a rear wheel control valve 17b. The piston is moved under the pressure of the pressurized oil fed into the power cylinder to assist in moving the third rack. That is, the steering system for the rear wheels 40 is also a power steering system and the rear wheels 40 are turned by an amount which is determined by the mechanical control box 50 according to the turning amount of the front wheels 5.

Now the mechanical control box 50 will be described in detail with reference to FIGS. 3 to 6.

Figure 3:
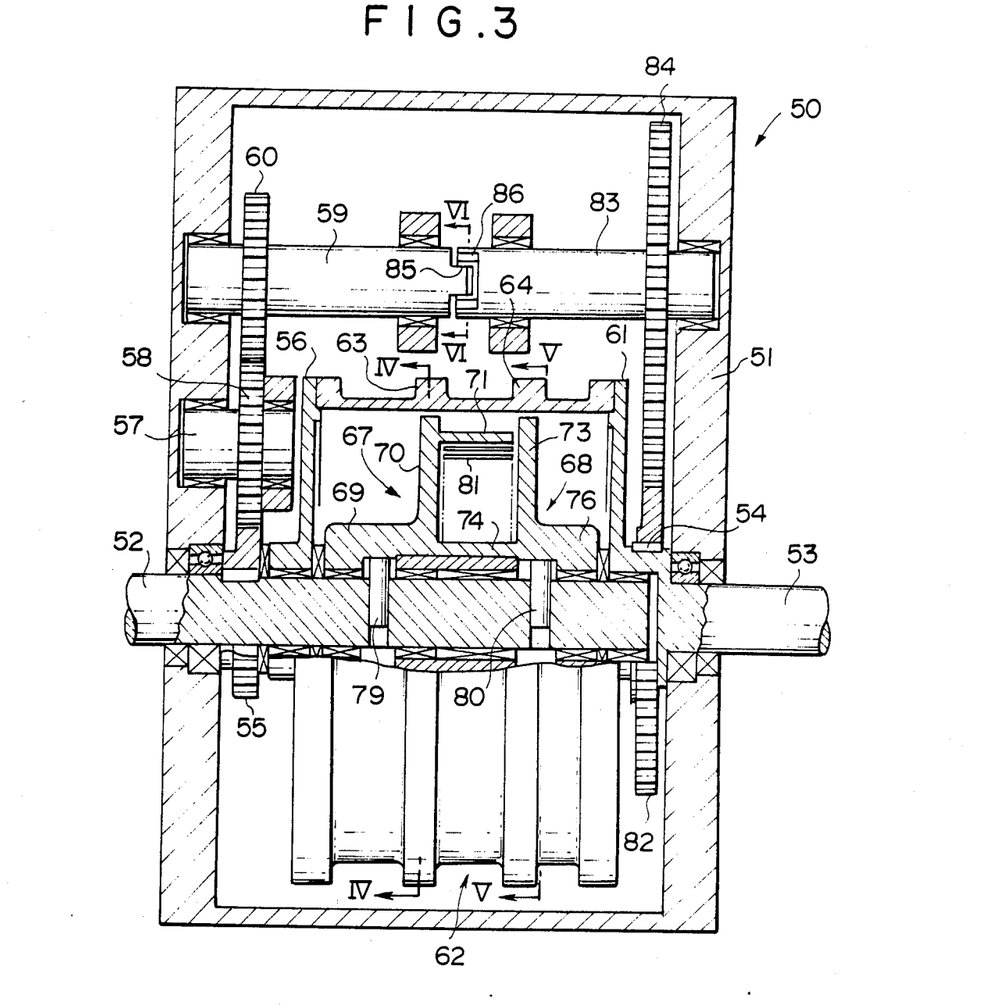
FIG. 3 is a cross-sectional view showing the mechanical control box employed in the four-wheel steering system.
Figure 4:
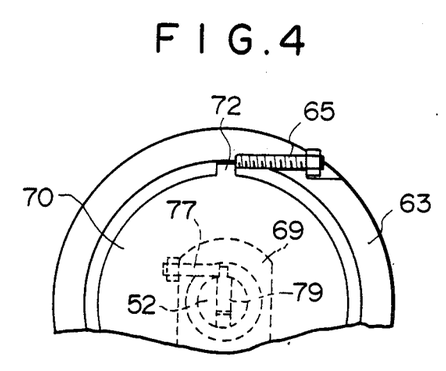
FIGS. 4 to 6 are cross-sectional views respectively taken along lines IV—IV, V—V and VI—VI in FIG. 3.
Figure 5:
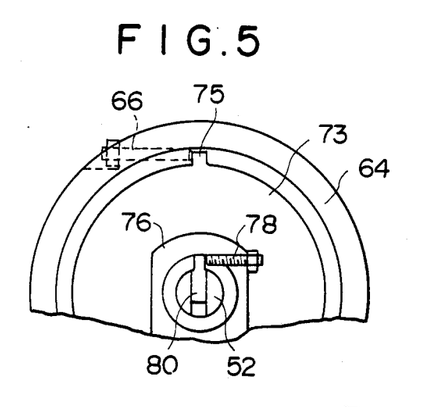
Figure 6:
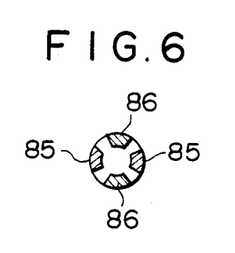

The input shaft 52 and the output shaft 53 are supported for rotation in the lower portion of a box-like housing 51. The free end of the input shaft 52 is fitted into a fitting portion 54 formed on the output shaft 53. A gear 55 is fixedly mounted on the input shaft 52 near one side wall of the housing 51 and a supporting flange member 56 is mounted on the input shaft 52 to be rotatable with respect thereto. The gear 55 is in mesh with an idler gear 58 fixedly mounted on a rotary shaft 57. A flange portion 61 is integrally formed on the output shaft 53 and is connected with the supporting flange member 56 on the input shaft 52 by a cylinder member 62 so that the flange member 56, the cylinder member 62 and the output shaft 53 having the flange portion 61 are integrally rotated. A pair of annular ribs 63 and 64 are formed on the outer peripheral surface of the cylinder member 62 at an intermediate portion thereof. Bolts 65 and 66 are screwed respectively into the ribs 63 and 64 in a direction tangential to the cylinder member 62 and opposite to each other as shown in FIGS. 4 and 5.

In the space defined by the flange member 56, the cylinder member 62 and the flange portion 61 of the output shaft 53 are mounted for rotation a pair of, or first and second, rotary members 67 and 68. The first rotary member 67 comprises a fitting portion 69 into which the input shaft 52 is fitted, a flange portion 70 and a cylindrical portion 71 extending in the axial direction from the flange portion 70 near the outer periphery thereof. A projection 72 is formed on the peripheral edge of the flange portion 70. The second rotary member 68 comprises a fitting portion 76 into which the input shaft 52 is fitted, a flange portion 73 and a cylindrical portion 74 extending in the axial direction from the flange portion 73 near the inner periphery thereof. A projection 75 is formed on the peripheral edge of the flange portion 73. A bolt 77 is screwed into the fitting portion 69 of the first rotary member 67 in a direction tangential thereto to be adapted to abut against a pin 79 inserted into the input shaft 52 as shown in FIG. 4, and similarly a bolt 78 is screwed into the fitting portion 76 of the second rotary member 68 in a direction tangential thereto but opposite to the direction of the bolt 77, the bolt 78 being adapted to abut against a pin 80 inserted into the input shaft 52. A torsion spring 81 is disposed in the space defined by the flange portions 70 and 73 and the cylindrical portions 71 and 74 with its opposite ends retained by the flange portions 70 and 73. The torsion spring 81 urges the first and second rotary members 67 and 68 to respectively make right-hand rotation and left-hand rotation under a preset load, whereby the projections 72 and 75 normally abut against the bolts 65 and 66, respectively.

On the fitting portion 54 of the output shaft 53 is mounted a gear 82 to be rotated integrally therewith. The gear 82 is in mesh with a gear 84 fixed on a rotary shaft 83 which is mounted for rotation in the housing 51 in opposition to said rotary shaft 59. A pair of diametrically opposed projections 85 are formed on the inner end face of the rotary shaft 59, and a pair of diametrically opposed projections 86 are formed on the inner end face of the rotary shaft 83. The inner end face of the rotary shaft 59 and the inner end face of the rotary shaft 83 are opposed to each other so that each projection of one rotary shaft is positioned between the projections of the other rotary shaft as clearly shown in FIG. 6. By way of this arrangement, rotation of the input shaft 52 is reversed and transmitted to the output shaft 53 after the projections 85 of the rotary shaft 59 and the projections 86 of the rotary shaft 83 abut against each other, as will become apparent later.

Now, the operation of the four-wheel steering system of this embodiment will be described.

When it is assumed that the steering wheel 1 is rotated rightward, said front wheel control valve is controlled by an amount corresponding to the amount of the rotation or the steering angle $\theta H$ so that the first and second racks are moved leftward under the pressure of the pressurized oil acting on the piston fixed to the first rack, whereby the front wheels 5 are turned rightward by an angle $\theta F$ and at the same time the input shaft 52 is rotated rightward by way of the second rack and the second pinion in mesh with each other.

When the input shaft 52 is rotated rightward, the second rotary member 68 is rotated rightward by way of the abutment of the pin 80 against the bolt 78 shown in FIG. 5, and because the bolt 77 on the first rotary member 67 does not abut against the pin 79 in the rightward rotation of the input shaft 52, the first rotary member 67 is rotated rightward integrally with the second rotary member 68 by way of the torsion spring 81. In this case, the cylindrical member 62 and accordingly the output shaft 53 is rotated rightward.

Rightward rotation of the input shaft 52 causes the rotary shaft 59 to rotate rightward by way of the gears 55, 58 and 60. When the turning angle $\theta F$ of the front wheels 5 is smaller than a predetermined angle $\theta 1$, the rotational speed of the rotary shaft 59 is reduced by virtue of the gear ratio of the gears 55, 58 and 60. In this case, rotation of the rotary shaft 59 is not transmitted to the rotary shaft 83 because there is a predetermined space between the projections 85 on the inner end face of the rotary shaft 59 and the projections 86 on the inner end face of the rotary shaft 83.

When the output shaft 53 is rotated rightward, the rear wheel control valve 17b is controlled so that the third rack is moved leftward under the pressure of the pressurized oil to turn the rear wheels rightward by an angle $\theta R$.

When the turning angle $\theta F$ of the front wheels 5 exceeds the predetermined angle $\theta 1$, and the projections 85 of the rotary shaft 59 and the projections 86 of the rotary shaft 83 come to abut against each other, rotation of the input shaft 52 is transmitted by the rotary shafts 59 and 83 and reversed by the gears 84 and 82 before being transmitted to the output shaft 53. In this case, a force which tends to rotate leftward the torsion spring 81 is exerted thereon by way of the cylindrical member 62 and first rotary member 67 and at the same time, a force which tends to rotate the torsion spring 81 rightward is exerted thereon. These two forces and said preset load exerted by the spring 81 permit the input shaft 52 to rotate rightward together with the second rotary member 68 and cause the output shaft 53 to rotate leftward together with the cylindrical member 62 and the first rotary member 67, deforming the spring 81. Thus the control on the rear wheel control valve 17b is reversed and the rear wheels 40 begin to be turned leftward, i.e., in the opposite direction to the turn of the front wheels 5. When the steering wheel 1 is further rotated to further turn the front wheels rightward beyond a second predetermined steering angle $\theta 2$, the rear wheels 40 are actually turned leftward or in the direction opposite to the front wheels 5.

The operation of the steering system of this embodiment when the steering wheel 1 is rotated leftward will be apparent to those skilled in the art from the description above and will not be described here.

Figure 7:
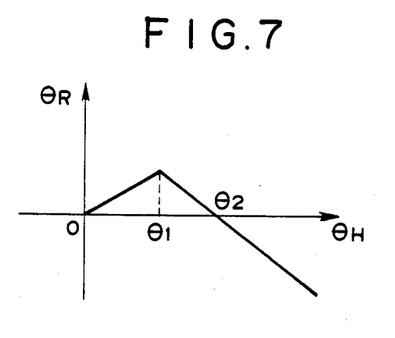
FIG. 7 is a view showing the relation between the turning angle of the steering wheel and the turning angle of the rear wheels in the four-wheel steering system.

FIG. 7 shows the relation between the turning angle $\theta H$ of the steering wheel 1 and the turning angle $\theta R$ of the rear wheels.

Figure 8:
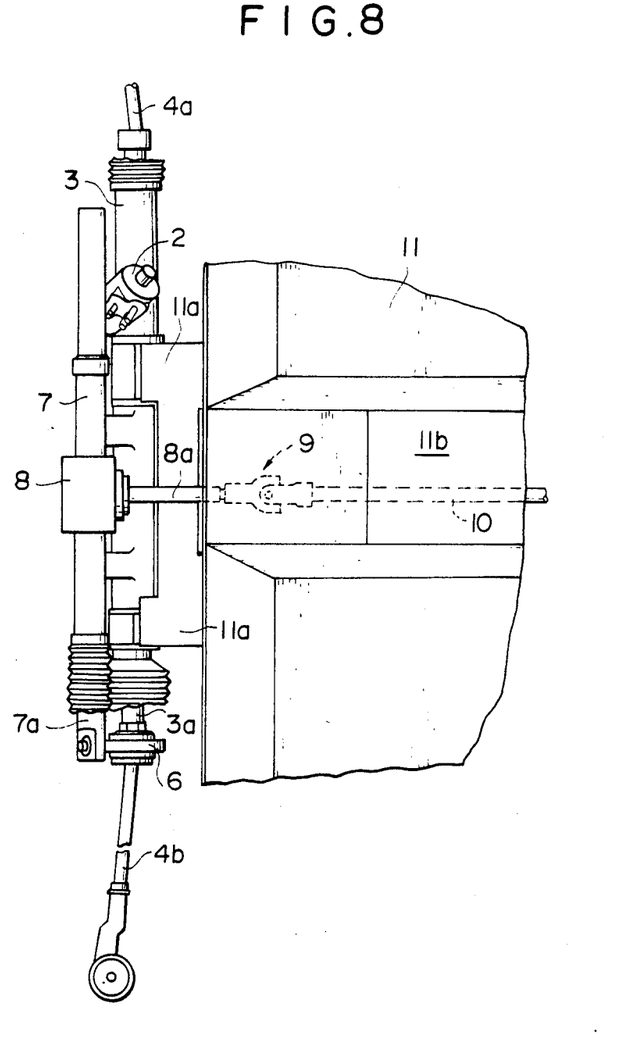
FIG. 8 is an enlarged view showing a part of the steering system of FIGS. 1 and 2.

FIG. 8 is an enlarged view showing the front wheel steering system in the four-wheel steering system of this embodiment. As shown in FIG. 8, said first rack housing 3 supporting said first rack indicated at 3a in FIG. 8 is fixed to the bracket 11a of the vehicle body 11. Said second rack is indicated at 7a and is in parallel to the first rack 3a. The second rack 7a is held in the second rack housing 7 to be movable in the transverse direction of the vehicle body and is connected with the first rack 3a by the connecting arm 6. In this particular embodiment, the first rack housing 3 and the second rack housing 7 are formed integrally with each other. In this case, the hole for accommodating the first rack 3a and the hole for accommodating the second rack 7a can be formed with a high accuracy in parallelism, and accordingly the first and second rack housings can be connected firmly and rigidly to be resistant to, for instance, a side force acting on the front wheels. However, this arrangement is disadvantageous in that the rack housings are difficult to manufacture and the components of the housings have poor interchangeability with the components for the two-wheel steering system. Therefore, the housings may be separately manufactured.

Figures 9, 10, 11:
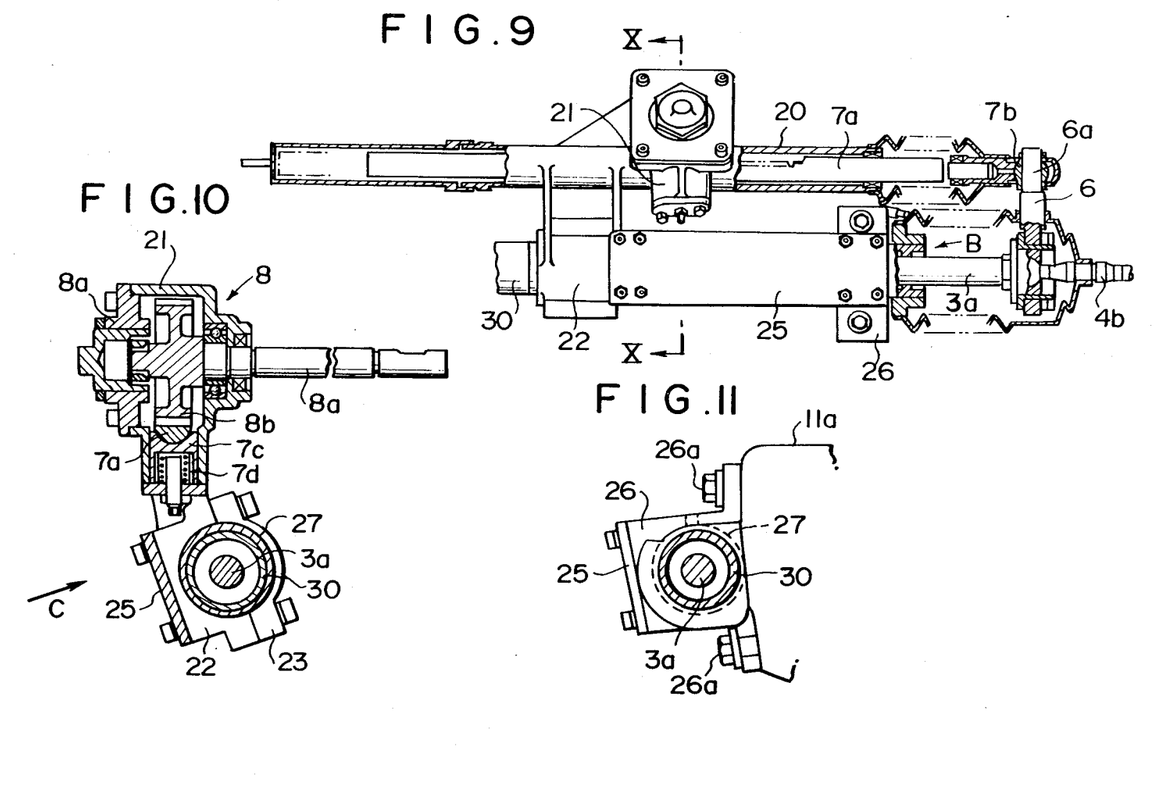
FIG. 9 is a view showing the part of a steering system in accordance with another embodiment of the present invention corresponding to the part shown in FIG. 8.
FIG. 10 is a cross-sectional view taken along line X—X in FIG. 9.
FIG. 11 is a side view as viewed in the direction of arrow B in FIG. 9.

FIGS. 9 to 11 show a four-wheel steering system in accordance with another embodiment of the present invention in which the first and second rack housing are separate from each other. FIG. 9 is a fragmentary front view as viewed from a lower front side of the vehicle body as indicated by arrow C in FIG. 10. FIG. 10 is a cross-sectional view taken along line X—X in FIG. 9 and FIG. 11 is a side view as viewed in the direction of arrow B in FIG. 9. In FIG. 9, a part of the left side is omitted. For example the first gear box 2 is not shown.

In this embodiment, the first rack 3a to be moved right and left in response to operation of the steering wheel is slidably accommodated in a first rack housing 30 which is fixedly mounted on the bracket 11a by way of a mounting member 26 with a mounting rubber 27 sandwiched therebetween. The mounting member 26 is fastened to the bracket 11a by bolts 26a. To a portion of the first rack 3a near the right end thereof is fixed a connecting arm 6. An end 6a of the connecting arm 6 is fitted into a spherical bushing 7b mounted on the right-hand end of the second rack 7a. That is, the first rack 3a and the second rack 7a are connected by way of the spherical bushing 7b. The second rack 7a is disposed in parallel to the first rack 3a and is held in a second rack housing 20 to be slidable in the transverse direction of the vehicle body. The second gear box 8 for accommodating the second pinion and the like comprises a gear housing 21 formed integrally with the second rack housing 20, and a gear cover 8a. The second rack 7a is in mesh with the second pinion 8b in the second gear box 8 and the second pinion 8b is connected to the output shaft 8a projecting rearward from the second gear box 8. The second rack 7a is urged toward the second pinion 8b by a spring 7d, which acts on the second pinion 8b through a plastic body 7c, so that the second rack 7a and the second pinion 8b mesh with each other with less play.

Further, the second rack housing 20 is provided with a connecting flange 22 formed integrally therewith and the second rack housing 20 is connected to the first rack housing 30 by way of the connecting flange 22. That is, the first rack housing 30 is placed on the connecting flange 22 with the mounting rubber 27 sandwiched therebetween and retained by a flange cover 23. The connecting flange 22 is connected with the mounting member 26 by a cross member 25, thereby increasing the rigidity of the first rack housing 30.

The four-wheel steering system of this embodiment in which the first and second rack housing are separate parts is advantageous in that the housings can be easily manufactured and that the steering system can be changed to a two-wheel steering system by simply removing the second rack housing 20 and the parts associated therewith.

Figure 12:
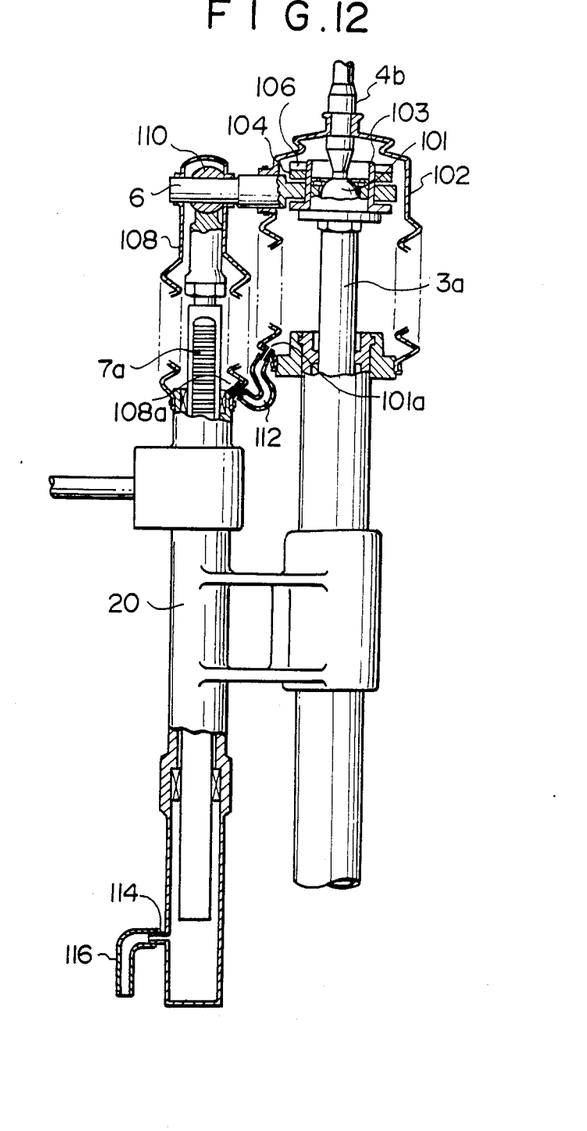
FIG. 12 is a plan view showing a part of a four-wheel steering system in accordance with still another embodiment of the present invention.

FIG. 12 shows a four-wheel steering system in accordance with another embodiment of the present invention which is substantially the same in operation as the embodiments described above but advantageous over the embodiments described above in the arrangement of dust boots for protecting movable parts. As shown in FIG. 12, the right and left ends of the first rack 3a are connected to the respective tie-rods 4b (only one end of the first rack 3a is shown) by way of a ball joint 101 and each end portion of the first rack 3a is covered by a first bellows 102 (as a dust boot). That is, the ball joint 101 is accommodated in a tubular support member 103 to which an end of the connecting arm 6 is fixed by nuts 104 and lock nuts 106. The connecting arm 6 extends through the first bellows 102 and through a second bellows 108 covering the corresponding end of the second rack 7a, and is connected to the end of the second rack 7a by way of a ball joint 110. The first and second bellows 102 and 108 are respectively provided with communicating holes 102a and 108a at inner end portions thereof. The communicating holes 102a and 108a are connected by an air pipe 112, thereby communicating with each other the internal spaces of the first and second bellows 102 and 108. The second rack housing 20 for accommodating therein the second rack 7a is provided with an opening 114 at the end thereof opposite to the end through which the second rack 7a projects. Into the opening 114 is fitted a breather pipe 116 which is bent inwardly of the vehicle body. Thus the internal space of the second bellows 108 is communicated with the atmosphere by way of the internal space of the second rack casing 20, the opening 114 and the breather pipe 116. Though not shown, the internal spaces of the first bellows 102 on the respective ends of the first rack 3a are communicated with each other.

When the first rack 3a and the second rack 7a are moved upon operation of the steering wheel, the first and second bellows 102 and 108 are expanded and compressed to change the internal volumes. At this time, because the internal spaces of the first and second bellows 102 and 108 are communicated with the atmosphere by way of the breather pipe 116, air enters and escapes from the first and second bellows 102 and 108 smoothly. Particularly, in this embodiment, because only a single breather pipe which is bent inwardly is used, dust, water, mud and the like are effectively prevented from entering the internal space of the bellows 102 and 108.

Figure 13:
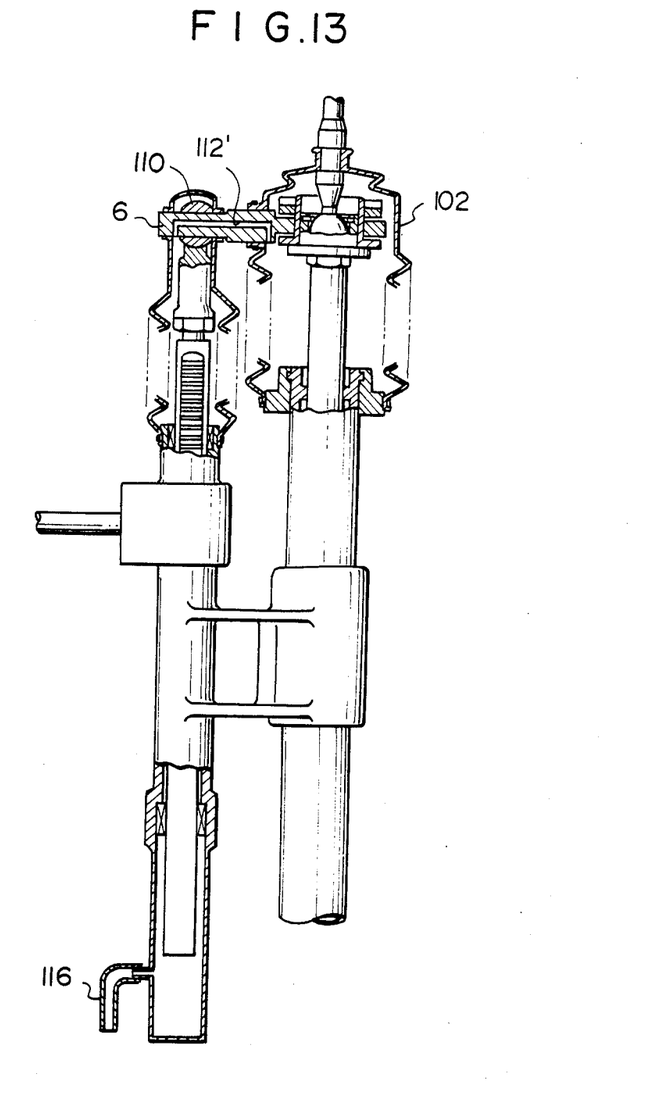
FIG. 13 is a view similar to FIG. 12 but of a steering system in accordance still another embodiment of the present invention.

Instead of communicating the internal spaces of the first and second bellows 102 and 108 by way of the air pipe 112, a communicating passage may be formed through the connecting rod 6 as indicated at 112' in FIG. 13. This arrangement is advantageous in that the pipe 112 and the holes 102a and 108a for fitting the pipe 112 become unnecessary and therefore sealing is facilitated.

We claim:

1. In a four-wheel steering system for a vehicle in which steering force of a front wheel steering system is transmitted to a rear wheel steering system by way of a mechanical transmission means so that the rear wheels are turned in response to turning of the front wheels, the improvement which comprises a steering-force-take-out means composed of a second rack member operatively connected with a first rack member of a rack and pinion front wheel steering system which is moved right and left in response to operation of a steering wheel so that the second rack member is moved together with the first rack member, a pinion in mesh with the second rack member and an output shaft fixed to said pinion, the output shaft being connected to the rear wheel steering system by way of a transmission shaft, and said first rack member being separate from the mounted parallel to the second rack member.

2. A four-wheel steering system as defined in claim 1 in which said first rack member of the steering-force-take-out means is mounted in parallel to the second rack of the rack-and-pinion type front wheel steering system.

3. A four-wheel steering system as defined in claim 1 in which said pinion is disposed substantially midway between the sides of the vehicle body and the transmission shaft extend in a tunnel portion of the vehicle body.

4. A four-wheel steering system as defined in claim 1 in which said second rack member of the front wheel steering system is connected with the first rack member of the steering-force-take-out means by way of a connecting member, and an end of the second rack member and an end of the first rack member are respectively covered with first and second bellows members which are communicated with each other by way of an air passage, the connecting member extending through both the first and second bellows members and the second bellows member being communicated to the atmosphere by way of a breather.

5. A four-wheel steering system as defined in claim 4 in which said first and second bellows members are provided with communicating holes connected by an air pipe, said air passage being formed by the air pipe.

6. A four-wheel steering system as defined in claim 4 in which said air passage is formed through the connecting member.

* * * * *